(12) United States Patent
Vedula

(10) Patent No.: US 7,370,036 B2
(45) Date of Patent: May 6, 2008

(54) FACILITATING IDENTIFICATION OF ENTIRE WEB PAGES WHEN EACH WEB PAGE IS RENDERED FROM MULTIPLE PORTIONS AND INTEREST IS EXPRESSED BASED ON CONTENT OF THE PORTIONS

(75) Inventor: Venkata Naga Ravikiran Vedula, Bangalore (IN)

(73) Assignee: Oracle International Corporation, Redwood Shores, CA (US)

( * ) Notice: Subject to any disclaimer, the term of this patent is extended or adjusted under 35 U.S.C. 154(b) by 309 days.

(21) Appl. No.: 10/905,997

(22) Filed: Jan. 28, 2005

(65) Prior Publication Data
US 2006/0173815 A1  Aug. 3, 2006

(51) Int. Cl.
G06F 7/00 (2006.01)
(52) U.S. Cl. .............................. 707/3; 707/6; 707/100
(58) Field of Classification Search .................... 707/3
See application file for complete search history.

(56) References Cited

U.S. PATENT DOCUMENTS

| 6,883,001 | B2 * | 4/2005 | Abe .......................... 707/10 |
| 6,915,294 | B1 * | 7/2005 | Singh et al. .................... 707/3 |
| 7,177,904 | B1 * | 2/2007 | Mathur et al. .............. 709/204 |
| 2003/0014399 | A1 * | 1/2003 | Hansen et al. ................ 707/3 |
| 2004/0093327 | A1 * | 5/2004 | Anderson et al. .............. 707/3 |
| 2004/0215664 | A1 * | 10/2004 | Hennings et al. ........ 707/104.1 |
| 2004/0267961 | A1 * | 12/2004 | Dietz et al. ................ 709/245 |
| 2006/0064411 | A1 * | 3/2006 | Gross et al. .................... 707/3 |
| 2006/0101077 | A1 * | 5/2006 | Warner et al. ........... 707/104.1 |
| 2006/0149721 | A1 * | 7/2006 | Langford ....................... 707/3 |

* cited by examiner

*Primary Examiner*—Don Wong
*Assistant Examiner*—Binh V Ho
(74) *Attorney, Agent, or Firm*—Narendra Reddy Thappeta

(57) ABSTRACT

A server system which stores data indicating the identifiers of web pages associated with which each portion has been previously rendered. The data facilitates identification of the entire web pages even if interest is expressed based on content of the portions. For example, a search engine may search the contents of the portions, and then send as search results the identifiers of the web pages which have previously included the portions. As a result, a user may be displayed the entire web pages (as opposed to just the content of the portion), which could be more meaningful.

25 Claims, 5 Drawing Sheets

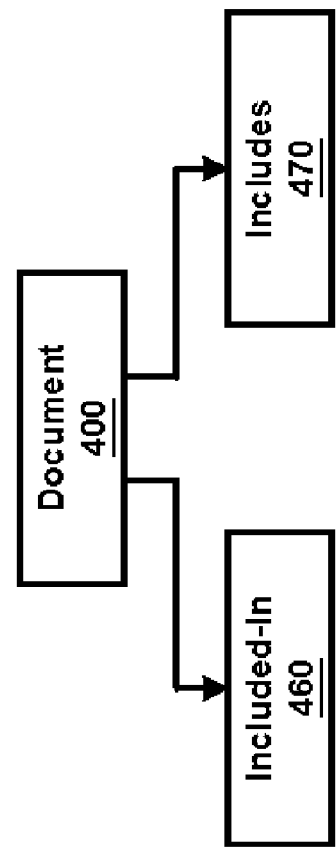
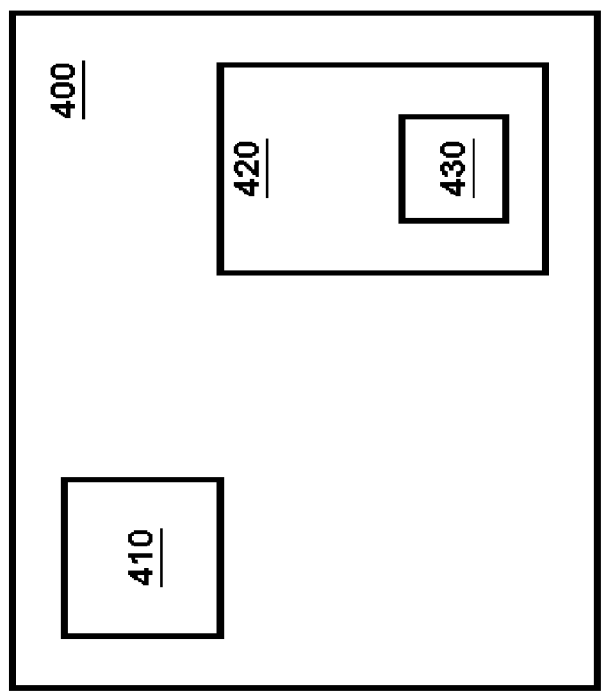
FIG. 4A
FIG. 4B

FACILITATING IDENTIFICATION OF ENTIRE WEB PAGES WHEN EACH WEB PAGE IS RENDERED FROM MULTIPLE PORTIONS AND INTEREST IS EXPRESSED BASED ON CONTENT OF THE PORTIONS

BACKGROUND OF THE INVENTION

1. Field of the Invention

The present invention relates to server systems used in providing access to data/service on networks, and more specifically to a method and apparatus for facilitating identification of entire web pages when each web page is rendered from multiple portions and interest is expressed based on content of the portions.

2. Related Art

Internet generally enables data and services to be accessed from various servers. In one common scenario, a user uses a browser software on a client system to specify a web page of interest, and the corresponding Uniform Resource Locator (URL) (along with any parameters) are transferred to a corresponding server system. The server system generally contains a page definition indicating the specific portions that together form each web page, and the area on the web page in which each portion is to be laid out.

In response to receiving the URL, a server system may retrieve different portions of data (representing text, image, etc.) from potentially multiple content servers and generates a web page of interest according to the corresponding page definition. The server system then sends the web page to the client system requesting the page, and the page is rendered on the client system. Using such an approach, a user may view multiple web pages, with each page containing several portions potentially retrieved from several sources.

One typical requirement is to enable a user to search the web pages previously displayed. In one prior approach, a server system determines various parameters (e.g., the identity of the user, parameters specified by the user, prior searches performed) to base a search on, and compares the data with different portions stored on the content servers. The URL corresponding to the matching portions is then displayed to the user, potentially for further browsing.

However, a user may have developed interest for desired content based on an entire content of the web page, and may thus wish to view the entire web page. Accordingly, the approach of above may be deemed to be inadequate at least in some scenarios such as in the case of dynamic web pages, in which the content of a web page is determined dynamically when the page is assembled. What is therefore needed is a method and approach which facilitates identification of entire web pages when each web page is rendered from multiple portions and interest is expressed based on content of the portions.

BRIEF DESCRIPTION OF THE DRAWINGS

The present invention will be described with reference to the accompanying drawings briefly described below.

FIG. 4A contains the layout of an example web and corresponding portions.

FIG. 4B depicts the data structures using which the data of FIG. 2 is stored in an embodiment of the present invention.

In the drawings, like reference numbers generally indicate identical, functionally similar, and/or structurally similar elements. The drawing in which an element first appears is indicated by the leftmost digit(s) in the corresponding reference number.

DETAILED DESCRIPTION OF THE PREFERRED EMBODIMENTS

1. Overview

A system provided according to an aspect of the present invention maintains data ("links") indicating an identifier of the web pages associated with which each portion is rendered. The links can then be used to identify the entire web pages associated with a portion if the content of the portion is deemed to be of interest.

Thus, in the case of searches described in an example embodiment below, a search engine can provide the URL of the entire web pages when a user specifies a search matching the content of the portion. The feature is particularly useful in the case of dynamic web pages since the content of the same web page can be different at different instances, and a search result can be made to include all such different contents.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well_known structures or operations are not shown in detail to avoid obscuring the features of the present invention.

2. Example Environment

Figure 1:
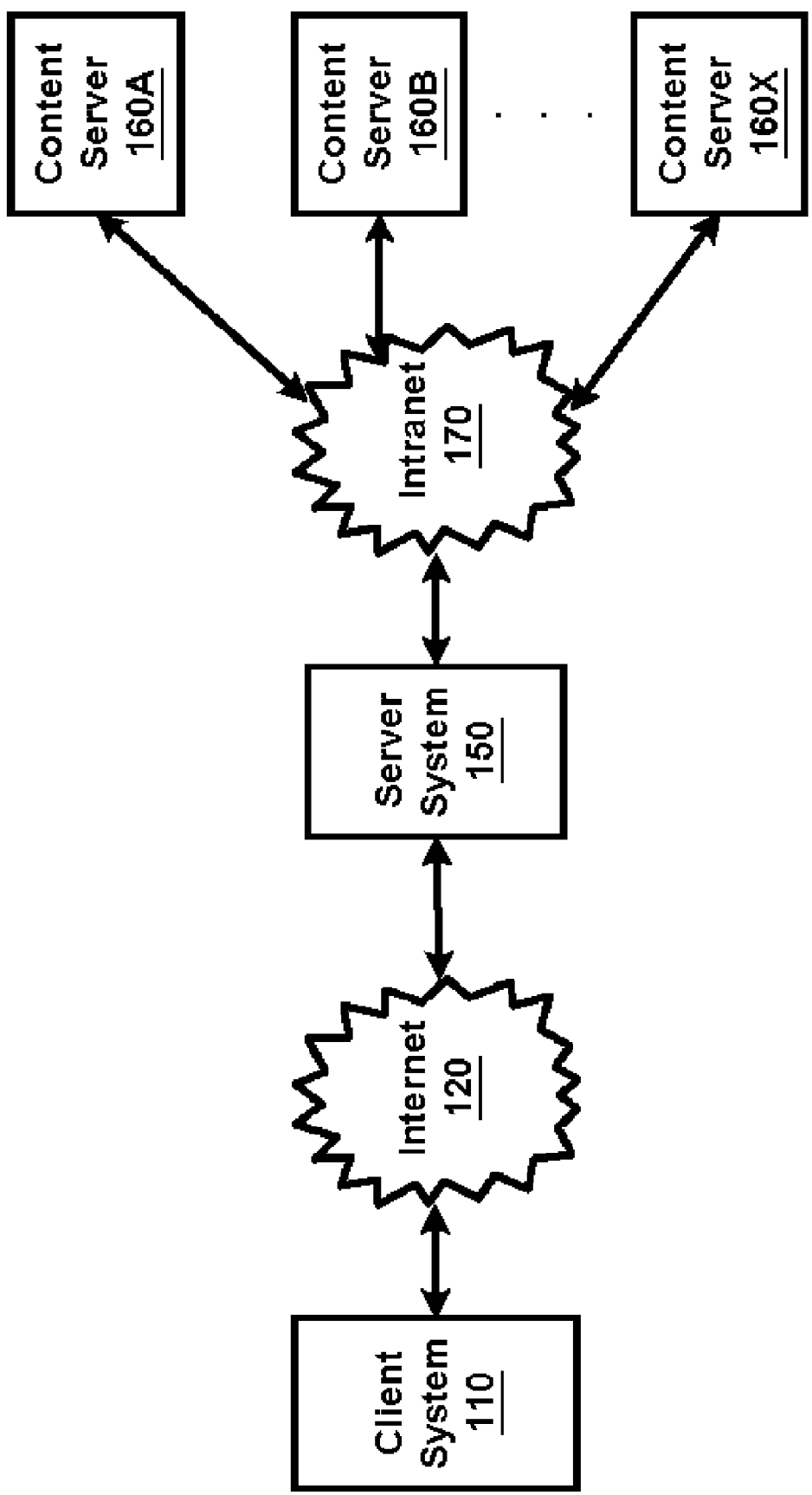
FIG. 1 is a block diagram of an example environment in which various aspects of the present invention can be implemented.

FIG. 1 is a block diagram illustrating an example environment in which various aspects of the present invention can be implemented. The environment is shown containing client system 110, Internet 120, server system 150, intranet 170, and content servers 160A-160X. Each component is described below in further detail.

Internet 120 generally refers to a conglomeration of network connecting various systems (here, client system 110 and server system 150), and is implemented using protocols such as Internet Protocol (IP). Intranet 170 is also implemented using protocols such as IP, and is generally owned or operated by an organization providing the content/services. Intranet 170 provides connectivity between server system 150 and content servers 160A-160X.

Content servers 160A through 160X may store (or otherwise provide access to) various portions of data, which are then assembled in the form of web pages (prior to rendering on client system 110A). Each portion can potentially be used in several web pages.

Client system 110A may execute software such as browsers enabling a user to specify specific web pages of interest. Identifiers (and any parameters generated by browsing) are forwarded to server system 150 via Internet 120.

Server system 150 receives the identifiers (e.g., URL) and any associated parameters, and determines the definition of the web page to be provided as a response. In general, a designer of the web page provides the definition for each web page to be served from server system 150. The definition typically indicates the specific portions of data that are to be retrieved from content servers 160A through 160X, and the specific area in which each portion is to be rendered. Server system 150 retrieves the indicated portions, assembles the portions to generate a corresponding web page, and forward the web page to the requesting client. Accordingly, server system 150 may be referred to as a web server.

Each portion may be specified to be contained in several different web page definitions, as noted above. As also noted above with the search engine example, it is desirable to identify the web pages associated with which each portion has been previously rendered, particularly in the case of dynamic web pages. An aspect of the present invention enables such a feature, as described below.

3. Method

Figure 2:
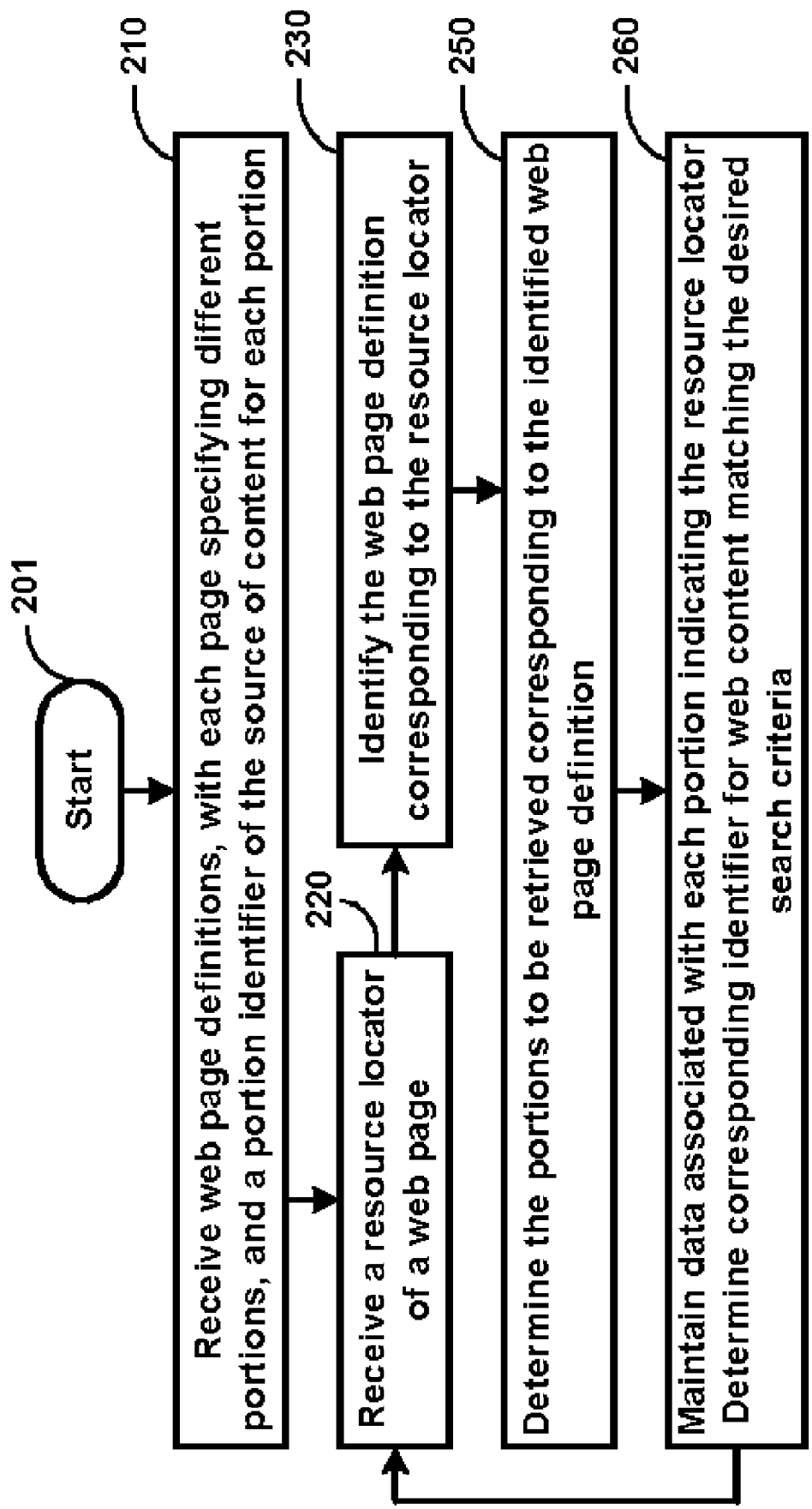
FIG. 2 is a flow-chart illustrating the manner in which a server system may maintain data, which indicates the web pages in which each portion has been included for rendering, according to various aspects of the present invention.

FIG. 2 is a flow-chart illustrating the manner in which a server system facilitates identification of entire web pages when each web page is rendered from multiple portions and interest is expressed based on content of the portions. The flow chart is described with reference to FIG. 1 merely for illustration. However, the features can be implemented in other environments as well. The flow chart begins in step 201, in which control immediately passes to step 210.

In step 210, server system 150 receives web page definitions, with each definition specifying different portions, and a portion identifier of the source of content for each portion. The page definition generally specifies the area on the page in which each portion is to be rendered.

In page 220, server system 150 receives a resource locator (URL) of a web page specified at client system 110A. In step 230, server system 150 identifies the web page definition corresponding to the resource locator (typically based on mapping data configured by an administrator). Various state information (e.g., data stored in cookies on client system 110A), the data entered by the user at client system 110A, may all be used in determined the web page definition.

In step 250, server system 150 determine the portions to be retrieved corresponding to the identified web page definition. The web page definition is examined to determine the portions corresponding to the web page to be rendered.

In step 260, server system 150 maintains data associated with each portion indicating the resource locator of the web page associated with (or in which) the portion is being rendered. The data provides links identifying the web pages corresponding to each portion. An example implementation of the data structures used to provide such features is described in sections below.

Control then passes to step 220. The loop of steps 220 through 260 is executed in processing request for each URL. As a result, the links are available indicating the web pages associated with each portion is rendered/displayed on client system 110A. The links thus generated can be used in several ways. An example use is described below in the content of searching.

4. Search Engine

Figure 3:
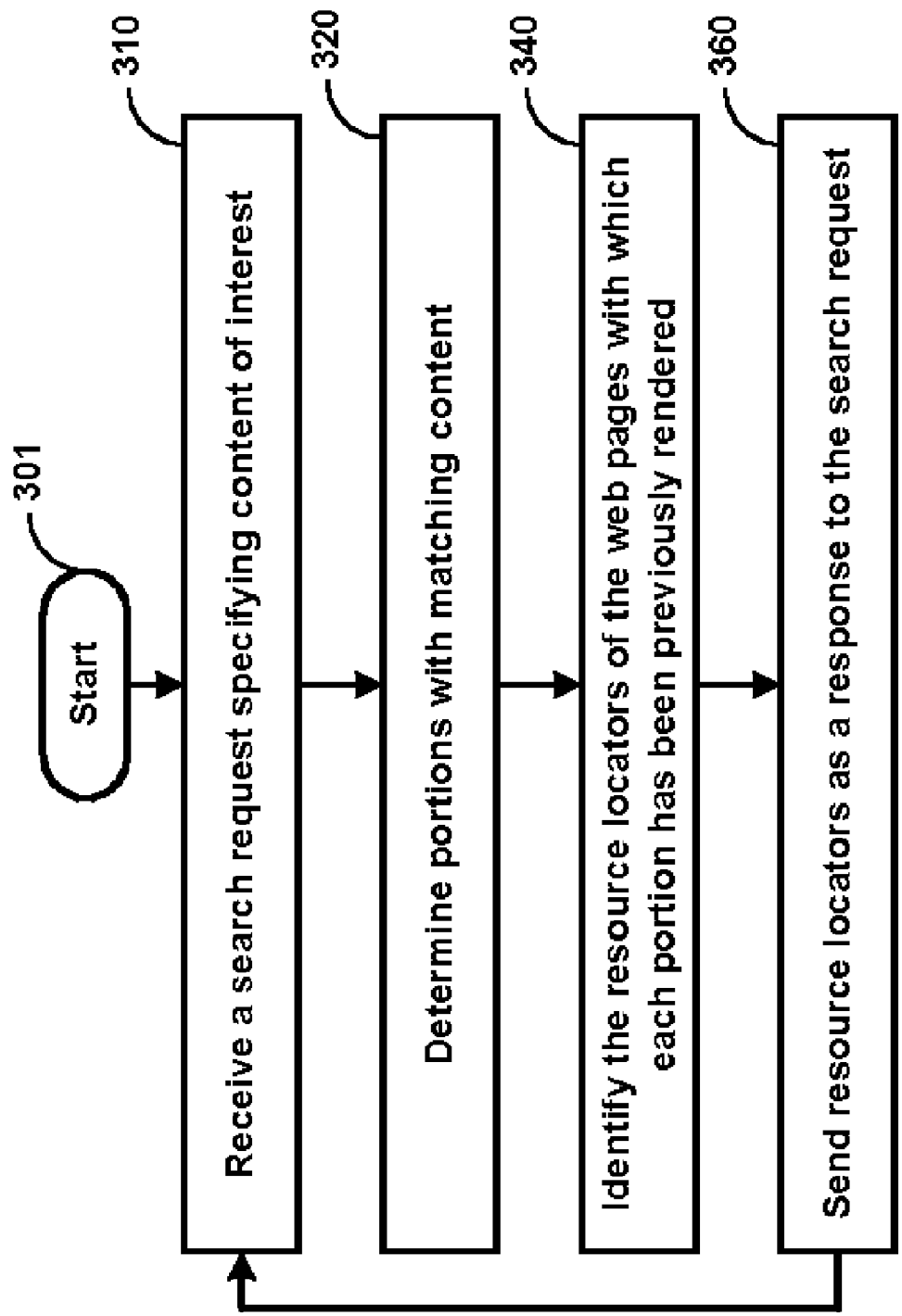
FIG. 3 is a flow-chart illustrating the manner in which a search engine may use the data of FIG. 2 according to various aspects of the present invention.

FIG. 3 is a flow chart illustrating the manner in which a search engine may allow a user to view the entire web page (using the links generated above) when a specified search criteria matches the content of a portion used in potentially several web pages. For illustration, it is assumed that server system 150 also operates as a search engine, even though the search engine can be implemented as a separate system, at least for performance reasons. The method begins in step 301, in which control immediately passes to step 310.

In step 310, server system 150 receives a search request specifying content of interest (from client system 110A). Server system 150 may generate search criteria using the values received with the search request.

In step 320, server system 150 determines portions with matching content. In general, the search criteria is compared with various data stored in the portion to determine whether there is a match.

In step 340, server system 150 identifies the resource locators of the web pages with which each portion has been previously rendered. The links generated using the flow chart of FIG. 2 may be used for such identification. It may be appreciated that an entire web page contains a single portion (stored in one of the content servers), and in such a case there may not be any links associated with the web page.

In step 360, server system 150 sends the identified resource locators as a response to the search request received in step 310. Typically, server system 150 first generates a web page with the resource locators embedded as hyperlinks, and also including the content matching the search criteria around each hyperlinked part. The generated web page is sent to client system 110A generating the search request in step 310. Control then passes to step 310 to process the next search request.

It should be understood that a user can select ('click' using a mouse) a hyperlink in the web page sent in step 360, and view the entire web page. Thus, using the links noted above, a search engine may facilitate a user to view entire web pages when each web page is rendered from multiple portions and interest is expressed based on content of the portions. As can be appreciated, the entire web page may have been earlier generated as dynamic web pages.

From the above, it may be appreciated that server system 150 needs to store data representing links identifying the web pages associated with which each portion is displayed. The manner in which the links are represented in an example embodiment is described below in further detail.

5. Links

FIG. 4A and FIG. 4B together illustrate the manner in which links can be stored according to an example approach. FIG. 4A depicts an example web page 400 containing portions 410 and 420. Portion 420 is shown containing a sub-portion 430. In general, the web page definition corresponding to web page 400 specifies the source of each of the (sub) portions.

Assuming that web page 400 is accessed, links would be generated (by operation of the flowchart of FIG. 2) indicating the portions using which web page 400 is generated. In an example embodiment, a data structure as represented by FIG. 4B is stored associated with each portion. As can be readily observed, the data structure contains fields included-in 460 and includes 470. Each field is described below in further detail.

Included-in field 460 indicates the portions (even a web page) in which the subject portion is included. Thus, included-in field 460 would contain identifier of web page 400 for each portion 410 and 420. Similarly, included-in field 460 for portion 430 would contain identifier of portion 420.

Includes field 470 indicates the portions which are included in the corresponding portion. Thus, includes field 470 for portion 420 may contain the identifier of portion 430, and for portion 410 the value may equal null.

The links thus generated would be used in step 340 of FIG. 3 as described now. In general, server system 150 determines whether the content of each portion matches a desired search criteria. Assuming that the content of portion 420 (or the content of portion 430, by virtue of the includes field 470 of portion 4420) matches the search criteria, the included-in field 460 is examined to determine that portion 420 was displayed associated with web page 400.

It should be understood that included-in field 460 may contain the identifiers of multiple web pages if the subject portion is included in the corresponding pages. Thus, step 340 may examine the values in included-in field 460 to determine the identifiers of web pages of interest to be included in the web page sent in step 360.

It may be further appreciated that a designer may wish to limit the portions associated with which the data structures of FIG. 4B are included. In general, a convention is required to specify the portions of interest, associated with which the links are to be stored. An example convention is described below.

A web page author generating the web page definition may incorporate additional 'comments' in the page definition according to a pre-specified convention, with the comments providing values for included-in field 460. Thus, in the page definition for web page 400, the following comment may be incorporated associated with a part of the document that causes portion 420 to be included in web page 400.

<!—Source document name="identifier of portion 420" Containing document name="identifier of web page 400"

Thus, only the presence of the above statement triggers the operation of step 260 when the page definition is being used to generate web page 400.

The approaches described above can be implemented in several environments. In one embodiment, the web page definition is according to Java Server Pages (JSP) (described in further detail in a book entitled, "Java Server Pages, 3rd Edition", by Hans Bergsten, ISBN: 0596005636). A dynamic page generator (e.g., a JSP compiler) may include a handler which causes the flowchart of FIG. 2 to be executed when the above-noted comment is encountered while generating the page.

In such an embodiment, the JSP compiler parses the web page definition while generating the HTML content that is to be sent to the browser on client systems 110. When the compiler encounters the above-noted comments during parsing, it updates the data structures with the details of the including document and included document. While the update operations are described with reference to JSP compiler merely for illustration, it should be understood that the operations can be performed by other components of server system 150 as well.

In addition, server system 150 can be implemented using a desired combination of hardware, software and firmware, as suited for the specific situation. In one embodiment, various features described above are operative when software instructions are executed on a digital processing system, and the details of a corresponding embodiment are described below in further detail.

6. Digital Processing System

Figure 5:
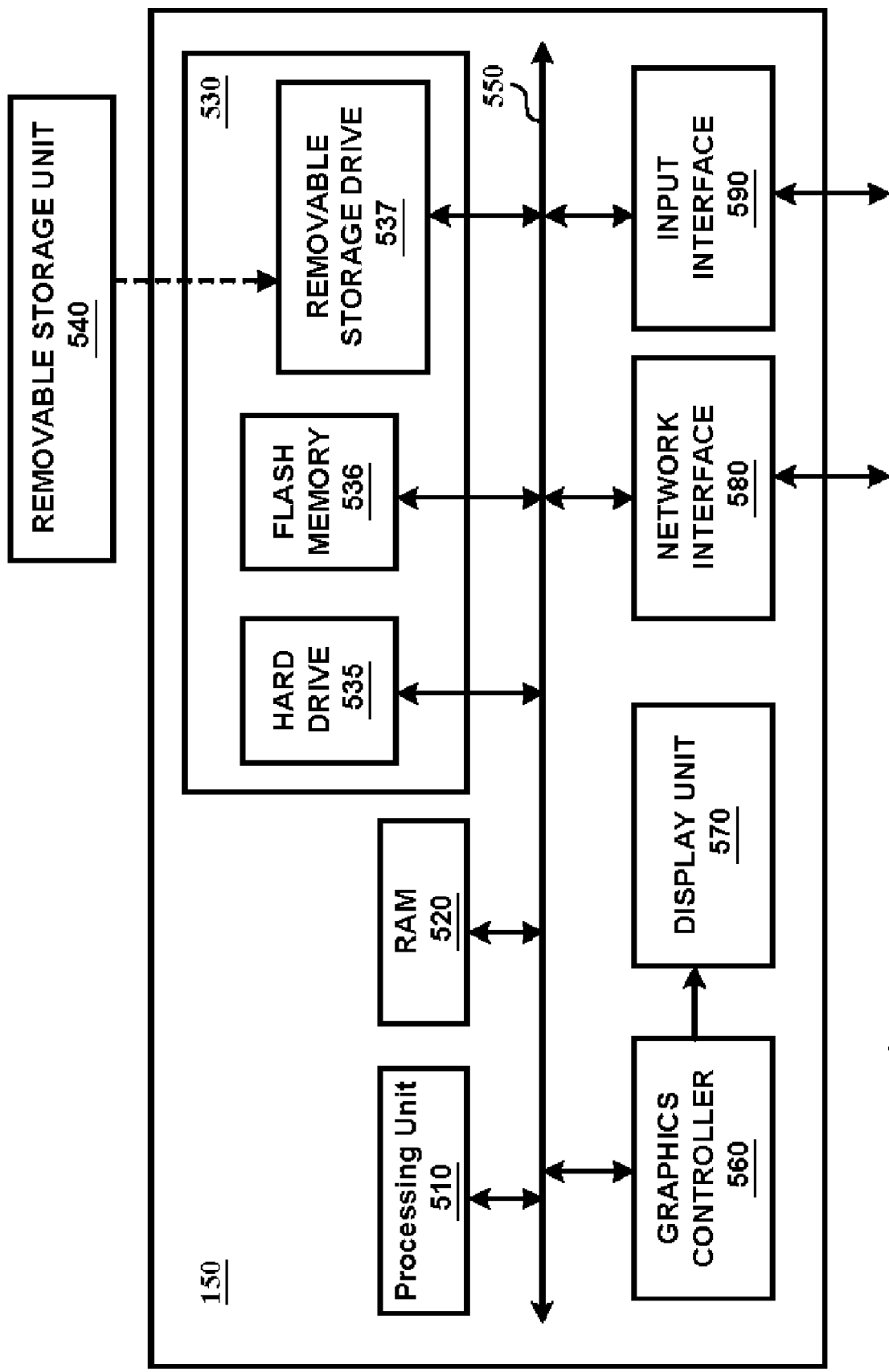
FIG. 5 is a block diagram illustrating an example embodiment in which various aspects of the present invention are operative when software instructions are executed.

FIG. 5 is a block diagram illustrating the details of server system 150 in which various aspects of the present invention are operative by execution of appropriate software instructions. Server system 150 may contain one or more processors such as central processing unit (CPU) 510, random access memory (RAM) 520, secondary memory 530, graphics controller 560, display unit 570, network interface 580, and input interface 590. All the components except display unit 570 may communicate with each other over communication path 550, which may contain several buses as is well known in the relevant arts. The components of FIG. 5 are described below in further detail.

CPU 510 may execute instructions stored in RAM 520 to provide several features of the present invention. CPU 510 may contain multiple processing units, with each processing unit potentially being designed for a specific task. Alternatively, CPU 510 may contain only a single general purpose processing unit. RAM 520 may receive instructions from secondary memory 530 using communication path 550.

Graphics controller 560 generates display signals (e.g., in RGB format) to display unit 570 based on data/instructions received from CPU 510. Display unit 570 contains a display screen to display the images defined by the display signals. Input interface 590 may correspond to a key_board and/or mouse. Network interface 580 provides connectivity to a network (e.g., using Internet Protocol), and may be used to communicate with both Internet 120 and intranet 170.

Secondary memory 530 may contain hard drive 535, flash memory 536 and removable storage drive 537. Secondary memory 530 may store the data and software instructions, which enable server system 150 to provide several features in accordance with the present invention. Some or all of the data and instructions may be provided on removable storage unit 540, and the data and instructions may be read and provided by removable storage drive 537 to CPU 510. Floppy drive, magnetic tape drive, CD_ROM drive, DVD Drive, Flash memory, removable memory chip (PCMCIA Card, EPROM) are examples of such removable storage drive 537.

Removable storage unit 540 may be implemented using medium and storage format compatible with removable storage drive 537 such that removable storage drive 537 can read the data and instructions. Thus, removable storage unit 540 includes a computer readable storage medium having stored therein computer software and/or data.

In this document, the term "computer program product" is used to generally refer to removable storage unit 540 or hard disk installed in hard drive 535. These computer program products are means for providing software to server system 150. CPU 510 may retrieve the software instructions, and execute the instructions to provide various features of the present invention described above.

7. Conclusion

While various embodiments of the present invention have been described above, it should be understood that they have been presented by way of example only, and not limitation. Thus, the breadth and scope of the present invention should not be limited by any of the above described exemplary embodiments, but should be defined only in accordance with the following claims and their equivalents.

What is claimed is:

1. A method of facilitating identification of entire web pages when each web page is rendered from a corresponding set of portions and interest is expressed based on the content of said set of portions and process search requests, said method comprising receiving a web page definition corresponding to each web page of interest, with said web page definition specifying different portions, and a portion identifier of the source of content for each portion; receiving a resource locator from a user system on a network requesting a first web page; identifying a first web page definition corresponding to said resource locator; determining a first set of portions to be included according to said first web page definition; sending said first web page including said first set of portions on said network to said user system; wherein said identifying, said determining and said sending are performed in response to receiving said resource locator; maintaining data associated with each of said first set of portions in response to said determining, said data indicating that each portion is included in said first web page, receiving a search request after said maintaining; determining a portion with content matching said search request; identifying a plurality of resource locators of the web pages with which said portion has been previously rendered by examining said maintained data; and sending said plurality of resource locators as a response to said search request.

2. The method of claim 1, wherein said maintaining uses a data structure with a included-in field associated with each of said first set of portion, said included-in field storing said resource locator associated with each of said first set of portions.

3. The method of claim 2, wherein said data structure further contains a include field, which specifies whether any sub-portion is included in a corresponding portion.

4. The method of claim 1, wherein said first web page comprises a dynamic web page.

5. The method of claim 1, further comprising generating a web page containing said plurality of resource locators, wherein said sending sends said web page as a response to said search request.

6. The method of claim 5, wherein said web page further comprises content matching criteria specified in said search request, and wherein said plurality of resource locators are included as hyperlinks in said web page, wherein each hyperlink when selected opens a corresponding entire web page corresponding to the resource locator.

7. A computer readable medium storing one or more sequences of instructions for causing a system to facilitate identification of entire web pages when each web page is rendered from a corresponding set of portions and interest is expressed based on the content of said set of portions and to process search requests, wherein execution of said one or more sequences of instructions by one or more processors contained in said system causes said one or more processors to perform the actions of receiving a web page definition corresponding to each web page of interest, with said web page definition specifying different portions, and a portion identifier of the source of content for each portion; receiving a resource locator from a user system on a network requesting a first web page; identifying a first web page definition corresponding to said resource locator; determining a first set of portions to be included according to said first web page definition; sending said first web page including said first set of portions on said network to said user system; wherein said identifying, said determining and said sending are performed in response to receiving said resource locator; maintaining data associated with each of said first set of portions in response to said determining, said data indicating that each portion is included in said first web page, receiving a search request after said maintaining; determining a portion with content matching said search request; identifying a plurality of resource locators of the web pages with which said portion has been previously rendered by examining said maintained data; and sending said plurality of resource locators as a response to said search request.

8. The computer readable medium of claim 7, wherein said maintaining uses a data structure with a included-in field associated with each of said first set of portion, said included-in field storing said resource locator associated with each of said first set of portions.

9. The computer readable medium of claim 8, wherein said data structure further contains a include field, which specifies whether any sub portion is included in a corresponding portion.

10. The computer readable medium of claim 7, wherein said first web page comprises a dynamic web page.

11. The computer readable medium of claim 10, further comprising generating a web page containing said plurality of resource locators, wherein said sending sends said web page as a response to said search request.

12. The computer readable medium of claim 11, wherein said web page further comprises content matching criteria specified in said search request, and wherein said plurality of resource locators are included as hyperlinks in said web page.

13. A system facilitating identification of entire web pages when each web page is rendered from a corresponding set of portions and interest is expressed based on the content of said set of portions and processing search requests, said system comprising means for receiving a web page definition corresponding to each web page of interest, with said web page definition specifying different portions, and a portion identifier of the source of content for each portion; means for receiving a resource locator on a network from a user system requesting a first web page; means for identifying a first web page definition corresponding to said resource locator; means for determining a first set of portions to be included according to said first web page definition; means for sending said first web page including said first set of portions to said user system, wherein said identifying, said determining and said sending are performed in response to receiving said resource locator; means for maintaining data associated with each of said first set of portions in response to said determining, said data indicating that each portion is included in said first web page; means for receiving a search request; means for determining a portion with content matching said search request; means for identifying a plurality of resource locators of the web pages with which said portion has been previously rendered; and means for sending said plurality of resource locators as a response to said search request.

14. The system of claim 13, wherein said means for maintaining uses a data structure with a included-in field associated with each of said first set of portion, said included-in field storing said resource locator associated with each of said first set of portions.

15. The system of claim 14, wherein said data structure further contains a include field, which specifies whether any sub-portion is included in a corresponding portion.

16. The system of claim 13, further comprising means for generating a web page containing said plurality of resource locators, wherein said means for sending sends said web page as a response to said search request.

17. The system of claim 16, wherein said web page further comprises content matching criteria specified in said search request, and wherein said plurality of resource locators are included as hyperlinks in said web page.

18. The method of claim 1, wherein said web page definition further specifies portions based on the content of which interest may be expressed and wherein said maintaining maintains data associated with each of said first set of portions for said specified portions.

19. The method of claim 1, wherein said search request is received from a user system and a web page is sent to said user system wherein said web page contains said plurality of resource locators included as a plurality of hyperlinks and wherein each of said plurality of hyperlinks, when selected, opens the corresponding entire web page with which said portion has been previously rendered.

20. The method of claim 7, wherein said web page definition further specifies portions based on the content of which interest may be expressed and wherein said maintaining maintains data associated with each of said first set of portions for said specified portions.

21. The method of claim 7, wherein said search request is received from a user system and a web page is sent to said user system, wherein said web page contains said plurality of resource locators included as a plurality of hyperlinks and wherein each of said plurality of hyperlinks, when selected, opens the corresponding entire web page with which said portion has been previously rendered.

22. The system of claim 13, wherein said web page definition further specifies portions based the content of which interest may be expressed and wherein said means for maintaining maintains data associated with each of said first set of portions for said specified portions.

23. The method of claim 13, wherein said search request is received from a user system and a web page is sent to said user system, wherein said web page contains said plurality of resource locators included as a plurality of hyperlinks and wherein each of said plurality of hyperlinks, when selected, opens the corresponding entire web page with which said portion has been previously rendered.

24. A method of processing search requests received on a network, said method comprising:
receiving a plurality of web page definitions, with each web page definition corresponding to a corresponding one of a plurality of web pages, with said web page definition specifying different portions, and a portion identifier of the source of content for each portion;
receiving a plurality of resource locators on a network, wherein each of said plurality of resource locators is received from a corresponding user system;
identifying a corresponding web page definition from said plurality of web page definitions corresponding to each of said plurality of resource locators;
determining a set of portions to be included according to said corresponding web page definition;
forming a plurality of web pages respectively corresponding to said plurality of resource locators, wherein each web page is formed by including the corresponding set of portions determined according to the corresponding web page definition;
sending each of said plurality of web pages on said network to the corresponding one of said plurality of user systems from which the corresponding resource locator is received;
maintaining data associated with each of said first set of portions in response to said determining, said data indicating that each portion is included in a corresponding web page;
wherein said identifying, said determining, said sending and said maintaining are performed in response to receiving said resource locator of said first web page;
receiving a search request from a second user system, said search request specifying a content of interest;
determining a set of portions with content matching said search request;
examining said data to identify a plurality of resource locators of said web pages with which any of said set of portions has been previously rendered;
sending to said second user system said plurality of resource locators of said web pages.

25. The method of claim 24, wherein a web page is sent to said second user system in response to said search request received from said second user system, wherein said web page contains said plurality of resource locators included as a plurality of hyperlinks and wherein each of said plurality of hyperlinks, when selected, opens the corresponding entire web page with which said portion has been previously rendered.

* * * * *

UNITED STATES PATENT AND TRADEMARK OFFICE
CERTIFICATE OF CORRECTION

PATENT NO.       : 7,370,036 B2  
APPLICATION NO.  : 10/905997  
DATED            : May 6, 2008  
INVENTOR(S)      : Venkata Naga Ravikiran Vedula Page 1 of 1

It is certified that error appears in the above-identified patent and that said Letters Patent is hereby corrected as shown below:

Col. 7, Line 15, replace "comprising receiving" with --comprising: receiving--

Col. 7, Line 64, replace "actions of receiving" with --actions of: receiving--

Col. 8, Line 43, replace "comprising means" with --comprising: means--

Col. 9, Line 40, replace "based the content" with --based on the content--

Signed and Sealed this

Twenty-third Day of December, 2008

JON W. DUDAS  
*Director of the United States Patent and Trademark Office*